Dec. 22, 1925.  
W. J. MOORE  
1,566,681  
PROTECTIVE DEVICE FOR VEHICLES  
Filed April 18, 1924  4 Sheets-Sheet 1

INVENTOR  
Walter J. Moore  
BY  
Thomas Howe ATTORNEY

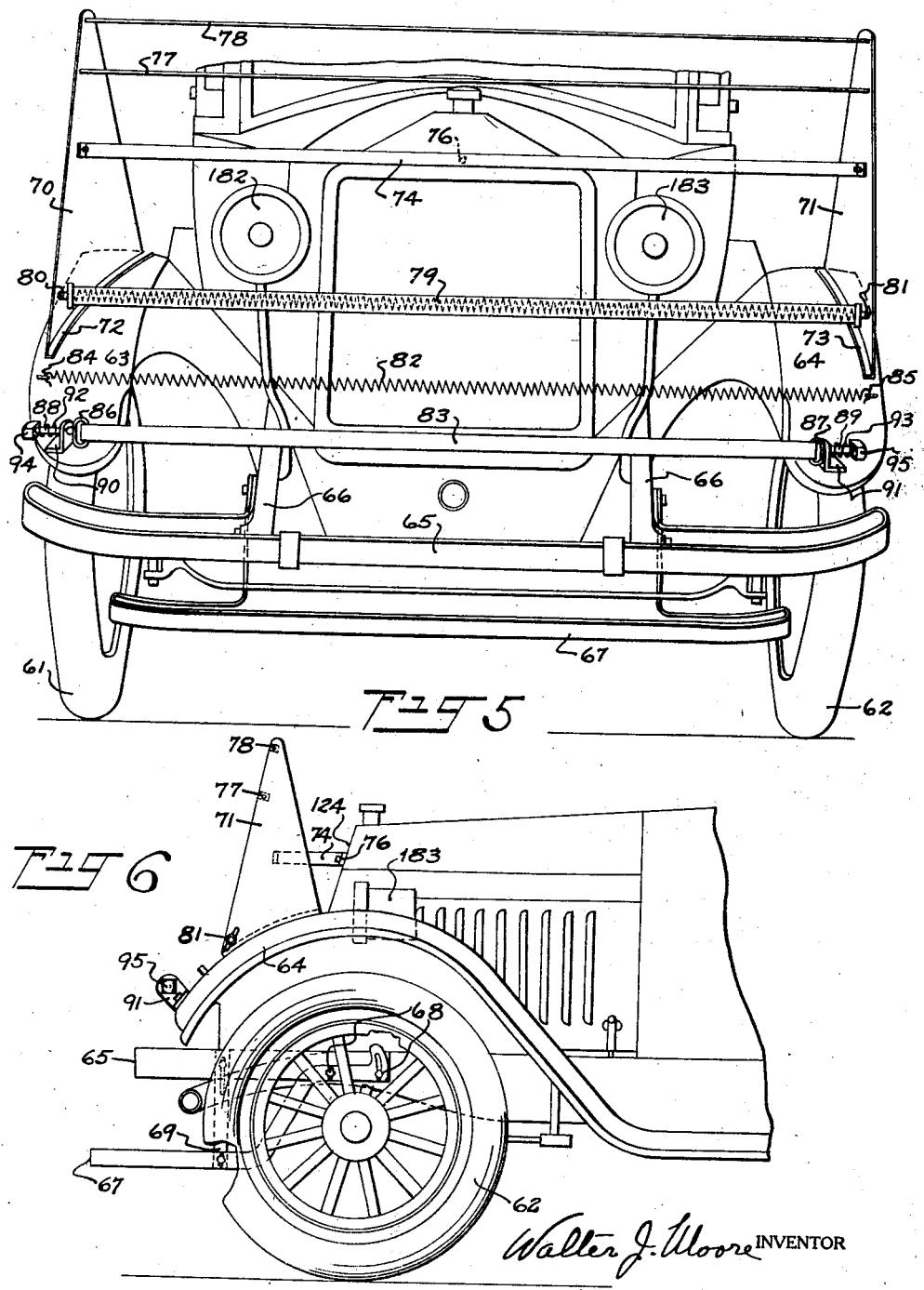

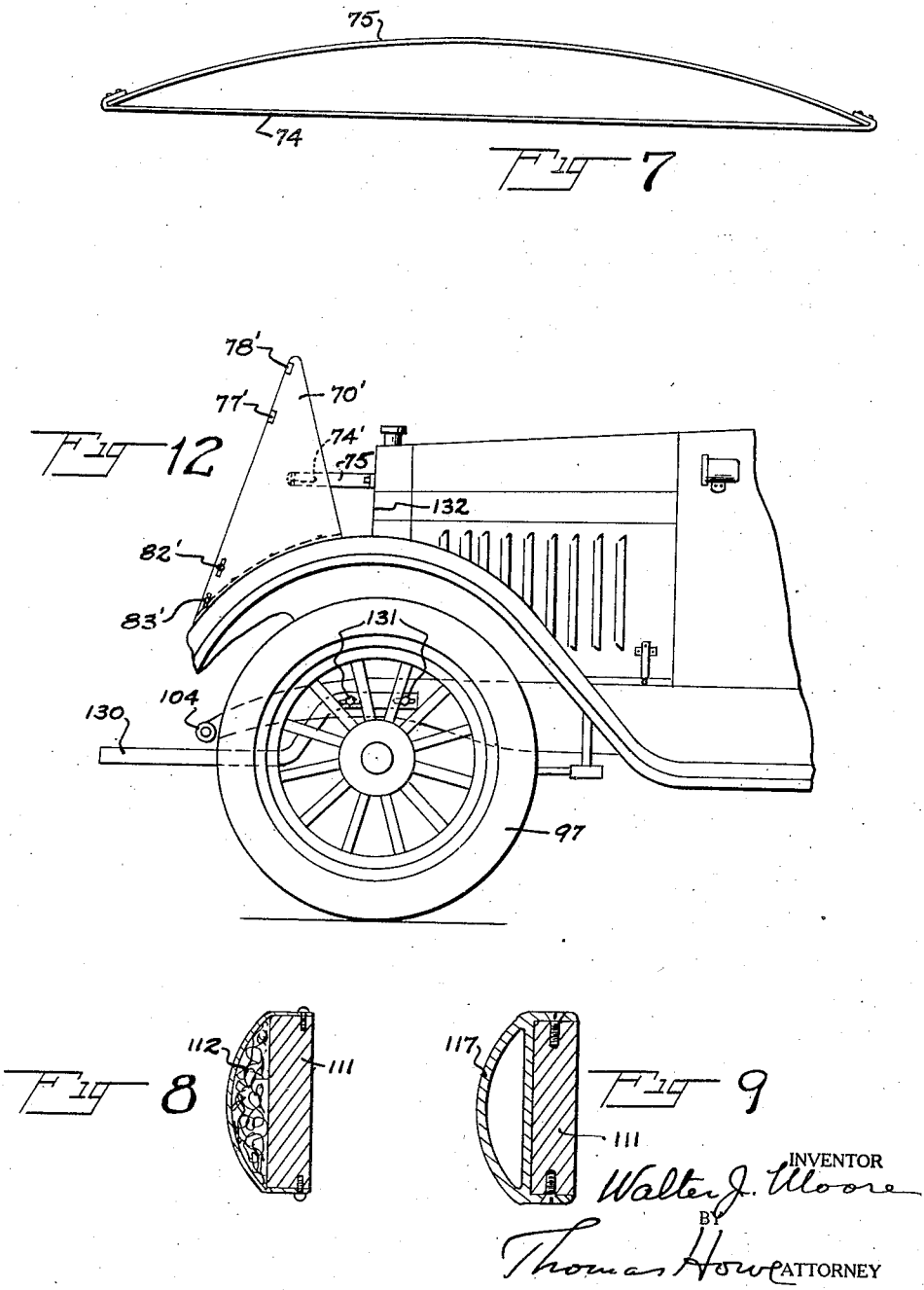

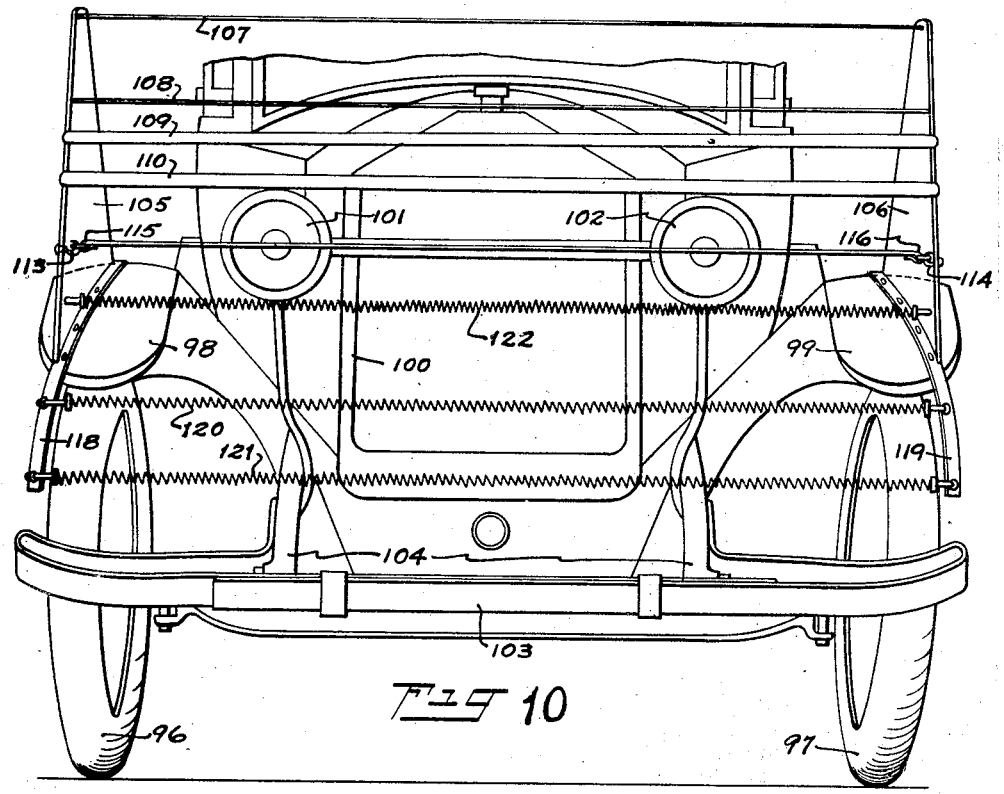
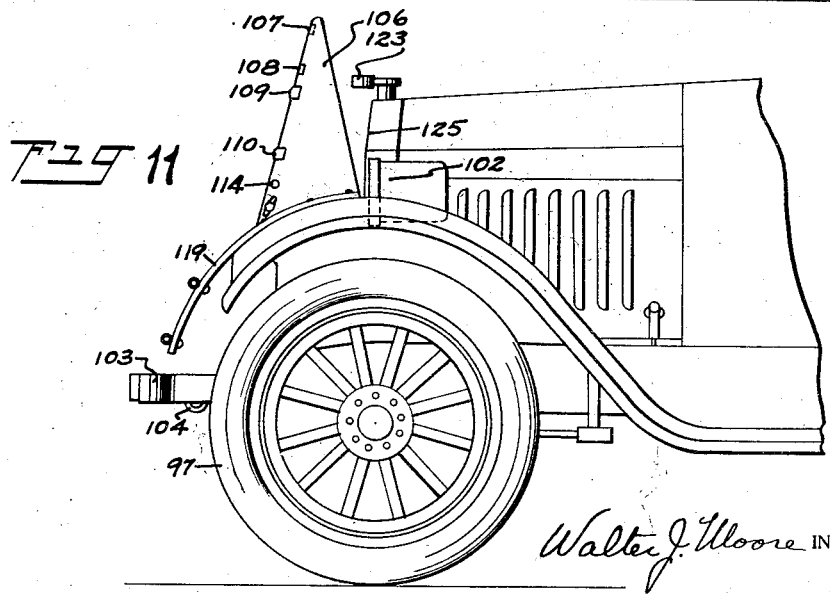

Patented Dec. 22, 1925.

1,566,681

UNITED STATES PATENT OFFICE.

WALTER J. MOORE, OF BROOKLYN, NEW YORK.

PROTECTIVE DEVICE FOR VEHICLES.

Application filed April 18, 1924. Serial No. 707,347.

*To all whom it may concern:*

Be it known that I, WALTER J. MOORE, a citizen of the United States of America, residing at city of New York, borough of Brooklyn, county of Kings, and State of New York, have invented new and useful Improvements in Protective Devices for Vehicles, of which the following is a specification.

This invention relates to means for protecting from injury persons struck by vehicles such as automobiles.

The main object of the invention is to insure protection of the victim to as great an extent as possible and this consistent with devices which may be practically carried by a vehicle and which may be within the limit of expense beyond which such devices could not go into wide practical use.

Other and ancillary objects of the invention will appear hereinafter.

In the accompanying drawings which illustrate the invention—

Fig. 5 is a front elevation of an automobile with devices according to my invention applied thereto;

Fig. 6 is a side elevation of the front end of the automobile as shown in Fig. 5;

Fig. 7 is a plan view of a brace for the collision screen;

Fig. 8 is a transverse section of a padded bar;

Fig. 9 is a similar view of another form of padded bar;

Fig. 10 is a front elevation of an automobile showing the invention applied thereto;

Fig. 11 is a side elevation of the front end of the automobile as shown in Fig. 10; and Fig. 12 is a side elevation of the front end of an automobile showing a modification.

Figure 1:
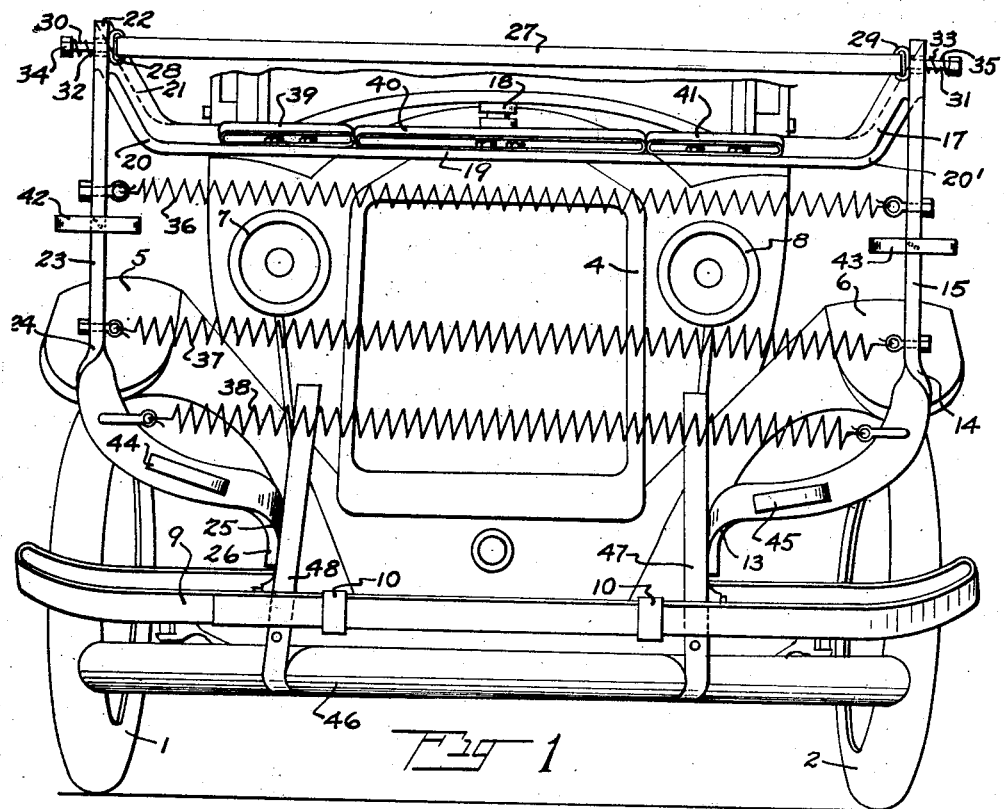
Fig. 1 is a front elevation of an automobile showing the application of the invention thereto.
Figures 2, 3, 4:
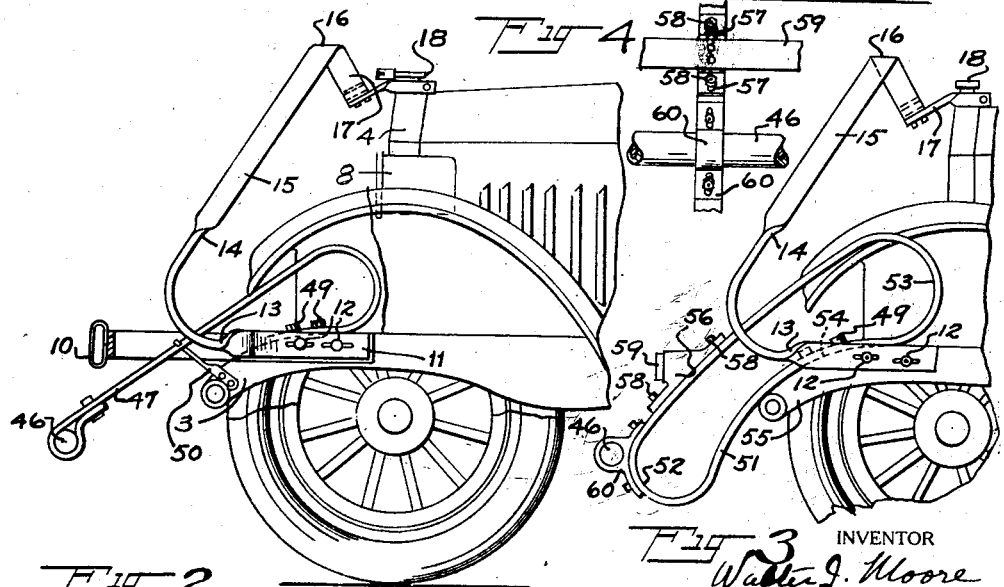
Fig. 2 is a side elevation of the front end of the automobile as shown in Fig. 1.
Fig. 3 is a view similar to Fig. 2 showing a modified construction.
Fig. 4 is a fragmentary view of a detail.

Referring to the drawings and first to Figs. 1 and 2, 1 and 2 are the front wheels of an automobile of usual construction, of which 3 is the front end of the chassis on which is mounted the usual radiator 4 and the mud guards 5 and 6 as well as other necessary and usual parts of an automobile including the headlights 7 and 8. Also there is secured to the forward end of the chassis the usual collision bumper 9 which may have a resilient pad 10 at its front and central portion to relieve the shock of any one struck by this bumper. The collision screen comprises a frame member, one end 11 of which is secured to the side of the chassis by the same bolts 12 which secure the collision bumper thereto. This frame member which is comprised of a flat strip has its major plane vertical alongside the chassis as shown, but at 13 is twisted so as to bring its major plane horizontal and transverse to the vehicle whereby a suitable spring of the member is provided, and it is again twisted through 90° at 14 so as to bring the portion 15, coming within the view of the driver, edgewise to his vision so as to obstruct it as little as possible. Again at 16 the frame member is bent so as to form the rearwardly extending portion 17, the frame strip maintaining its edgewise position to the view of the driver. It is again bent at 20' forming the member 19 which extends across the front of the vehicle below the top of the radiator so as to be below the driver's vision, and at its middle is secured by a suitable clamp to the radiator intake 18. At the opposite side of the vehicle from the bend 20' is a similar bend 20, from which extends an arm 21 similar to the opposite arm 17, and there is a bend at 22 corresponding to that at 16, an upright side portion 23 edgewise to the vision of the driver and corresponding to the portion 15, a twist 24 corresponding to the twist 14, a twist 25 corresponding to the twist 13, and the flat end 26 like the end 11 on the opposite side and secured to the chassis by the same bolts as the collision bumper, as already referred to in connection with the opposite side of the chassis.

It will be seen that by this construction it is only necessary to support the collision screen frame at three points namely the front end of the chassis on each side and the radiator intake, and that it is a one-piece construction, which is advantageous from the standpoint of manufacture and efficiency of the device.

Extending between the side frame members 15 and 23 is a strip 27 of greater width than thickness which provides a broad surface against which the person struck may come and at the same time may be placed edgewise so as to avoid interference with the vision of the operator, this strip, it will be noted, being above the top of the radiator. This strip is resiliently secured to the frame at its ends by being secured in eyes 28 and 29 on the ends of the bolts 30 and 31 which extend through openings in the frame members, these openings being preferably elongated into the slots as shown so that the bolts are adjustable longitudinally therein to vary the height of the strap. The resilient mounting is provided by springs 32 and 33 interposed between the ends of the nuts 34 and 35 on the ends of the bolts.

Other resilient members 36, 37 and 38 suitably spaced apart and secured at their ends to the frame members, extend from the collision screen frame at one side to the frame at the other side of the vehicle. Each of these devices being below the vision of the operator need not necessarily be made thin so that edgewise placing may be effected and so they may satisfactorily be of coiled spring as shown which is resilient in itself. For appearance this spring may have a cover as shown.

In order to avoid danger of injury to the person struck by coming against any of the frame members, resilient buffers 39, 40 and 41 are mounted on the bar 19, each of these members comprising front portions having the ends reflexed beneath them and secured to the bar 19. Similarly buffers 42 and 43 are mounted on the frame members 23 and 15 respectively and also the similar buffers 44 and 45 are mounted on the lower ends of the frame members. This arrangement of buffers in conjunction with the members extending between the portions 15 and 23 comprise a complete resilient receiving means for a person struck so that he is kept from injury. The ordinary collision bumper is too far from the ground to insure that all persons collided with will be struck at a point to cause them to fall rearwardly against the resilient cushioning means or collision screen, and it may here be noted that it is desired that the present apparatus provides means for causing the person struck to fall rearwardly and then receiving him in such manner as to prevent or minimize the damage to him. The falling of the victim forward would throw him violently against the pavement resulting in serious injury, usually a fractured skull.

To accomplish the desired result in this respect the trip bumper is provided. This bumper comprises a bar or pipe 46 extending transversely across the front of the vehicle below and in front of the collision bumper, this being supported by springs 47 and 48 each extending upwardly within the collision bumper and then curved downwardly, their ends being secured at each side by bolts as 49 to the top of the chassis. Being spring mounted these members are liable to chatter against the collision bumper and to guard against this a hook 50 secured to the front end of the chassis on each side may limit the movement of the springs 47 toward the collision bumper and prevent such chattering, this manner of preventing the chattering being thought to be better than placing resilient buffers on the collision bumper, or the trip bumper supporting springs at the points of contact to prevent injurious chattering.

To soften the bar 46 it may be enclosed in a rubber jacket or covering.

It will now be apparent that a person struck will be first struck by the bar 16 which is so low as to insure that it will collide with the victim below the knees. The victim will then fall toward the vehicle and will be prevented from injury in coming against the collision bumper by the buffer 10 while the upper portions of the body will be caught on the rearwardly inclined collision screen which is to the rear of the collision bumper and extending high enough to prevent the victim from coming against the top of the radiator. On account of the spring mounting of the bar 46 of the trip bumper, if the automobile should collide with a post, tree or other immovable obstruction, the trip bumper would be moved rearwardly and the shock of the collision taken on the collision bumper as usual.

Referring now to Figs. 3 and 4, the construction of collision screen is the same as shown in Figs. 1 and 2 but instead of being independently mounted as shown in those figures, the trip and collision bumpers are shown as having a common mounting. Thus on each side of the vehicle a spring 51, reflexed at 52 and 53 is secured at 54 to the top of the chassis 55, while to the forward end of the spring is secured a bracket 56 which is adjustable by reason of having slots 57 through which its securing bolts 58 extend. The collision bumper 59 extending across the front of the car is secured at its ends to these brackets. A similar bracket 60 is similarly adjustably secured to the spring 51 below the bracket 56. The trip bumper bar 46 being secured in these brackets at its ends. The operation of this apparatus is similar to that of Figs. 1 and 2 but, as stated above, has a common spring mounting for the trip and collision bumpers instead of having them mounted separately.

Referring now to Figs. 5, 6 and 7, the automobile comprises the usual front wheels 61 and 62, mud guards 63 and 64 and the usual collision bumper 65 secured at its ends to the chassis 66. The trip bumper 67 extends below and forwardly of the collision bumper and is secured to the chassis by bolts 68 which may be those also securing the collision bumper to the chassis, and the trip bumper may further be supported by links 69 extending between the collision and trip bumpers. It will be seen that the link 69 and the rear end of the trip bumper are slotted so that the bumper may be turned about the forward one of the bolts 68 to raise it out of the way in traveling rough roads in country districts or lowered into operating position for use on city streets. Secured upon the mud guards respectively are frame members 70 and 71 which are of sheet metal narrower at the top than the bottom and secured to the mud guards at the bottom by means of flanges 72 and 73 by riveting, bolting, soldering or in any other suitable way. It has previously been proposed to mount these frame members upon the mud guards and to provide rearwardly extending braces to give them suitable support and rigidity. With the present construction the bracing is inherent within the members themselves, they being of sufficient extent to constitute the frame member or bracing means. This lends itself readily to efficiency of the structure obtained and low cost of manufacture. These sheets are so disposed that they extend longitudinally of the vehicle and at a slight angle thereto so that they are presented edgewise to the vision of the driver so as to not interfere therewith. The frame members are spaced apart and secured to the front of the radiator by a bow-shaped member, shown in plan at Fig. 7, having its ends secured to the frame members 70 and 71. This member comprises the bar 74 directly across the front of the vehicle between the members 70 and 71 (and secured thereto and bracing them apart) and the metal spring bow portions 75 which is secured to the frame members and also to the front of the radiator at 76. The fact that this member presents a broad side longitudinally of the vehicle is of no moment as it is below the top of the radiator and hence does not come within the vision of the driver to interfere therewith; also it is not in front of the lamps.

Above the top of the radiator and adjacent the tops of the frame members 70 and 71 are secured the strips 77 and 78 of resilient material and of greater width than thickness, they being presented edgewise longitudinally of the vehicle so as not to interfere with the vision of the driver. Adjacent the bottom of the members 70 and 71 is a strip 79 extending across the front of the vehicle. This strip should be resilient and may consist of a coiled spring as shown, the ends of the spring being secured to bolts 80 and 81 extending through the members 70 and 71 respectively, the openings for these bolts being preferably slots so that the member 75 may be adjusted up and down. Inasmuch as this strip does not come within the line of vision of the driver and is not in front of the usual headlights 82 and 83 it is immaterial whether the broad or narrow sides of the strip are longitudinal of the vehicle. In order to fill in the space between the strip bumper and the member 79 two resilient members 82 and 83 are secured to and extend between the mud guards below the members 70 and 71, the strip 82 being shown as a coiled spring secured to brackets 84 and 85 on the mud guards, while the member 83 is a strip of resilient material such as leather or even a steel strip. This strip 83 is secured at its ends in the eyelets 86 and 87 fastened to the ends of the bolts 88 and 89 extending through holes in brackets 90 and 91 secured to the respective mud guards, springs 92 and 93 being interposed between the respective brackets and the nuts 94 and 95 whereby the strip has a resilient mounting.

It is to be observed that in this construction the space for the reception of the collision screen is increased by sloping back the front 124 of the radiator and mounting the headlights 182 and 183, with their fronts on a level with or to the rear of the front face of the radiator so that they do not take up room by projecting ahead of the front face of the radiator as is usual.

Referring now to Figs. 8, 9, 10 and 11, the automobile there shown comprises wheels 96 and 97, mud guards 98 and 99, radiator 100 and headlights 101 and 102; also a collision bumper 103 is secured to the chassis 104 of any well known or suitable construction. The collision bumper, however, is mounted lower than usual so that it will operate effectively as a trip bumper and in order that the transverse members for receiving the persons struck may extend downwardly into sufficient proximity to the collision bumper, extensions for the collision screen members are added to the front ends of the mud guards. The collision screen comprises sheet metal members 105 and 106 which are disposed edgewise in the vision of the driver. They are of less width at the top than at the bottom as shown and have inherently the front and rear bracing so that separating braces of this character are unnecessary. Extending between the members 105 and 106 across the front of the vehicle and above the top of the radiator so as to be in the line of vision of the driver are two strips 107 and 108 of suitable resilient material such as leather, these strips being of greater width than thickness and being disposed edgewise to the vision of the driver. Below the top of the radiator so that they do not come materially into the line of vision of the driver are two bars 109 and 110 extending between the frame members 105 and 106. These bars may be constructed as shown in Fig. 8 from which it will be seen that each consists of a wooden bar 111 to the front side of which is secured a stuffed cushion or buffer 112. These bars being stiff serve to hold the members 105 and 106 from being pulled towards each other, while the cushion at the front enables them to serve as transverse members of the collision screen.

It is to be observed that these bars 109 and 110 are above the area of projection of light of the headlights 101 and 102 and being also below the top of the radiator there is nothing they obstruct either as to light or vision so that it is not necessary that they be placed edgewise. If desired, in place of the cushion 112 a pneumatically inflated pad 117 may be provided as shown in Fig. 9 at the front of the bar 111.

The resilient strip 107 which is in front of the headlights and which is of greater width than thickness, is adjustable so that it may be placed edgewise longitudinally of the vehicle so as to interfere as little as possible with the light from the headlights, this being accomplished by securing the ends of the strip to the members 105 and 106 by rotatably mounted hooks 113 and 114 to which the strip is secured by links 115 and 116. Also they may be removed, by unhooking their ends so that they may be entirely removed from in front of the headlights if desired. Secured to each of the mud guards respectively are downwardly curved strips of metal 118 and 119, to which are secured respectively the ends of resilient strips 120 and 121 so disposed as to fill in the gap between the combined collision and trip bumper and the resilient member 122 extending across the front of the vehicle and secured at the junction of the mud guards and members 105 and 106. In order to guard against any possible impact of the head of the person struck, or any other parts, against the top of the radiator there is secured to the cover or cap of the radiator a resilient buffer 123. In this construction space is economized by having the front of the headlights 101 and 103 so that they do not project forwardly of the front face 125 of the radiator, but in some instances (as here shown) it is unnecessary to slope this face of the radiator backwardly in order to secure the desired space for the collision screen.

Referring to Fig. 12, the apparatus there shown is like that of Figs. 5 and 6 except that the transverse members 77', 78', 82' and 83' are all mounted on the side members as 70' of the collision screen frame instead of certain of the transverse members being mounted on the mud guards as in the former figures referred to, the side frame members here extending substantially to the front ends of the mud guards. The collision screen structure is here braced to the radiator by a member 74' like the member having the parts 74 and 75 in Figs. 5, 6 and 7. Also the bumper 130 performs the functions of the collision and trip bumpers of the previous figures. The bumper 130 is secured at each end to the chassis by bolts 131 occupying the usual holes for securing the collision bumper, the holes in the bumper being elongated so that the bumper may be adjusted longitudinally of the vehicle. The bumper, it will be seen, is substantially at the level of the vehicle axle where it is at the best height to act both as trip and collision bumper. It will also be observed that the front face 132 of the radiator is substantially vertical.

While in most automobiles a radiator is mounted at the front of the car as herein shown, it is to be understood that in cars of other construction, as for instance air cooled cars, the similarly located part will perform the functions of the radiator so far as the present invention is concerned.

While the invention has been illustrated in what are considered its best applications it may have other embodiments without departing from its spirit and is not, therefore, limited to the structures shown in the drawings.

What I claim is:

1. The combination with a vehicle, of mud guards adjacent the forward end thereof and a collison screen comprising upstanding frame members mounted upon said mud guards, each of said members being of sheet metal of greater width at the bottom than at the top, and so disposed as to be edgewise to the line of vision of the operator and collision members extending between said frame members.

2. The combination with a vehicle, of mud guards adjacent the forward end thereof and a collision screen comprising upstanding frame members mounted upon said mud guards, each of said members being of sheet metal of greater width at the bottom than at the top, and collision members extending between said frame members.

3. The combination with a vehicle having a frame of a trip bumper disposed at the forward end of said vehicle, said bumper being secured to said frame and comprising securing shanks bent downwardly to support the said bumper below the height of said frame, said bumper being unsupported forward of the points where it is secured to said frame, and a collision screen at the forward end of said vehicle.

4. The combination with a vehicle of a collision bumper at the forward end thereof, a collision screen at the forward end of the vehicle and a trip bumper adjustably secured to said collision bumper.

5. The combination with a vehicle of a collision bumper at the forward end thereof, a collision screen at the forward end of the vehicle and a trip bumper adjustably secured to said collision bumper, said trip bumper being of lighter construction and more resilient than said collision bumper so as to give under major collisions.

6. The combination with a vehicle of a collision screen disposed at the forward end thereof comprising members extending transversely across the vehicle adapted to receive the body of a person struck, said transversely extending members at the top of said screen and within the view of the driver presenting less dimensions to the view longitudinally of the vehicle than the lower of said transverse members.

7. The combination with a vehicle of a collision screen disposed at the forward end thereof comprising members extending transversely across the vehicle adapted to receive the body of a person struck, said transversely extending members at the top of said screen and within the view of the driver presenting less dimensions to the view longitudinally of the vehicle than the lower of said transverse members, said lower transverse members being coiled-springs.

8. The combination with a vehicle of mud guards and a collision screen, comprising vertically extending frame members and transversely extending members for receiving the body of a person struck, said screen being mounted entirely on the mud guards.

9. The combination with a vehicle having a radiator and mud guards, of a collision screen comprising vertically extending frame members and transversely extending members adapted to receive the body of a person struck, and resilient means extending from said screen to said radiator, said screen being entirely mounted upon said mud guards except for said resilient means.

10. The combination with a vehicle having a radiator and mud guards, of a collision screen comprising vertically extending frame members and transversely extending members adapted to receive the body of a person struck, and a bow spring extending from said screen to said radiator, said screen being entirely mounted upon said mud guards except for said bow spring.

11. The combination with a vehicle of a collision screen at the front thereof, a collision bumper and a trip bumper, said bumpers being adjustable with relation to each other and to the ground.

12. The combination with a vehicle, of a collision screen, a trip bumper, a collision bumper and a spring supporting both said trip and collision bumpers.

13. The combination with a vehicle, of a collision screen, a trip bumper, a collision bumper and a common supporting means for said trip and collision bumpers, said bumpers being adjustable upon said supporting means.

14. The combination with a vehicle, of a collision screen, a trip bumper, a collision bumper and a spring supporting both said trip and collision bumpers, said bumpers being adjustably mounted on said spring supporting means.

15. A frame member for a collision screen for vehicles which comprises a metallic member fastened at one end to the chassis of the automobile, said frame member extending in a smooth curve between the mud guard and the chassis member to clear the arc of travel of the vehicle wheels, said member being supported independently of said mud guard.

16. A frame member for a collision screen for vehicles which comprises a metallic member fastened at one end to the chassis of the automobile, said frame member extending in a smooth curve between the mud guard and the chassis member to clear the arc of travel of the vehicle wheels, said member being supported independently of said mud guard and means for bracing said member from the radiator of the automobile.

17. The combination with a vehicle of a collision screen at the end thereof, comprising two frame members each comprising a metallic member fastened at one end to the chassis of the vehicle, each of said frame members extending in a smooth curve between the mud guard and the chassis to clear the arc of travel of the wheel, said frame members being supported independently of the mud guards and a bracing member extending between said frame members.

18. The combination with a vehicle of a collision screen at the end thereof, comprising two frame members each comprising a metallic member fastened at one end to the chassis of the vehicle, said frame member extending in a smooth curve between the mud guard and the chassis to clear the arc of travel of the wheel, said frame members being supported independently of the mud guards and a bracing member extending between said frame members, said bracing member being secured to the radiator.

19. A frame for a collision screen for vehicles, which comprises two metallic members each fastened at one end to the chassis and extending in a smooth curve between the mud guard and the chassis to clear the arc of travel of the wheel, and a bracing member secured to said frame members and extending between them, said frame members and brace being in one integral piece.

20. A frame for a collision screen for vehicles which comprises two metallic members each fastened at one end to the chassis and extending in a smooth curve between the mud guard and the chassis to clear the arc of travel of the wheel, and a bracing member secured to said frame members and extending between them, and lamps on said vehicle, said bracing member extending transversely of the vehicle forward of the radiator and above said lamps.

21. A frame for a collision screen for vehicles which comprises two metallic members each fastened at one end to the chassis and extending in a smooth curve between the mud guard and the chassis to clear the arc of travel of the wheel, and a bracing member secured to said frame members and extending between them, said brace extending rearwardly and downwardly from said frame members.

22. A frame for a collision screen for vehicles which comprises two metallic members each fastened at one end to the chassis and extending in a smooth curve between the mud guard and the chassis to clear the arc of travel of the wheel, and a bracing member secured to said frame members and extending between them, said brace extending rearwardly and downwardly from said frame members, said frame members extending above the radiator.

23. A frame for a collision screen for vehicles, which comprises two metallic members each fastened at one end to the chassis and extending in a smooth curve between the mud guard and the chassis to clear the arc of travel of the wheel, and a bracing member secured to said frame members and extending between them and resilient buffing means upon said brace.

24. The combination with a vehicle, of a collision screen mounted thereon comprising a frame including a frame member at each side, each of said frame members being secured at one end to the chassis of the vehicle and extending in a smooth curve between the mud guard and the chassis to clear the arc of travel of the wheel, and a bracing member extending between said frame members, said frame members having resilient buffers mounted on the said smooth curves, upon the portions above said curves and upon said bracing member.

In testimony whereof I have signed this specification this 16th day of April 1924.

WALTER J. MOORE.